United States Patent
Uemura et al.

(10) Patent No.: US 9,491,744 B2
(45) Date of Patent: Nov. 8, 2016

(54) TERMINAL APPARATUS, BASE STATION APPARATUS, COMMUNICATION SYSTEM, RADIO RESOURCE REQUESTING METHOD AND INTEGRATED CIRCUIT

(71) Applicant: SHARP KABUSHIKI KAISHA, Osaka-shi, Osaka (JP)

(72) Inventors: Katsunari Uemura, Osaka (JP); Yasuyuki Kato, Osaka (JP); Hidekazu Tsuboi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/394,484

(22) PCT Filed: Mar. 27, 2013

(86) PCT No.: PCT/JP2013/058940
§ 371 (c)(1),
(2) Date: Oct. 15, 2014

(87) PCT Pub. No.: WO2013/157362
PCT Pub. Date: Oct. 24, 2013

(65) Prior Publication Data
US 2015/0050938 A1    Feb. 19, 2015

(30) Foreign Application Priority Data

Apr. 19, 2012 (JP) .................... 2012-095188

(51) Int. Cl.
H04W 72/00 (2009.01)
H04W 72/04 (2009.01)
H04W 72/12 (2009.01)
H04W 88/02 (2009.01)
H04W 88/08 (2009.01)

(52) U.S. Cl.
CPC ..... *H04W 72/0413* (2013.01); *H04W 72/1278* (2013.01); *H04W 88/02* (2013.01); *H04W 88/08* (2013.01)

(58) Field of Classification Search
None
See application file for complete search history.

(56) References Cited

U.S. PATENT DOCUMENTS

| 2009/0305716 | A1 | 12/2009 | Ono |
| 2011/0255492 | A1 | 10/2011 | Dai et al. |
| 2011/0305211 | A1* | 12/2011 | Lunttila ............. H04L 5/0092 370/329 |
| 2014/0301338 | A1* | 10/2014 | Zhong .............. H04L 5/0037 370/329 |

FOREIGN PATENT DOCUMENTS

| JP | 2012-503379 A | 2/2012 |
| JP | 2012503379 | * 2/2012 |
| JP | 2012-70134 A | 4/2012 |

OTHER PUBLICATIONS

3GPP TR 36.822 V0.2.0 (Nov. 2011) 3rd Generation Partnership Project; Technical Specification Group Radio Access Network; LTE RAN Enhancements for Diverse Data Application (Release 11), pp. 1-33.

* cited by examiner

*Primary Examiner* — Adolf Dsouza
(74) *Attorney, Agent, or Firm* — Birch, Stewart, Kolasch & Birch, LLP

(57) ABSTRACT

A terminal apparatus in a communication system that includes a base station apparatus and the terminal apparatus. The terminal apparatus is configured to receive a transmission configuration of an uplink control channel. In addition, the terminal apparatus is configured to transmit the uplink control channel based on a first transmission configuration or a second transmission configuration, wherein the second transmission configuration includes an extended parameter of the first transmission configuration, and the uplink control channel is used for a scheduling request.

2 Claims, 3 Drawing Sheets

TERMINAL APPARATUS, BASE STATION APPARATUS, COMMUNICATION SYSTEM, RADIO RESOURCE REQUESTING METHOD AND INTEGRATED CIRCUIT

TECHNICAL FIELD

Embodiments of the present invention relate to a terminal apparatus, a base station apparatus, a communication system, a radio resource requesting method, and an integrated circuit that can improve efficiency of radio resource use by efficiently performing a radio resource request control between a mobile station apparatus and the base station apparatus.

BACKGROUND ART

In the standardization project 3rd Generation Partnership Project (3GPP), standardization of Evolved Universal Terrestrial Radio Access (hereinafter, referred to as EUTRA) has been performed by adopting an orthogonal frequency-division multiplexing (OFDM) communication scheme or a flexible scheduling of a predetermined frequency and time unit referred to as a resource block to realize high-speed communications.

In addition, discussion on Advanced EUTRA that has upper compatibility to EUTRA and realizes more high-speed data transfer is being made in the 3GPP. Besides the advantage of realizing high-speed data transfer, other discussion is also being made to solve a problem in that the power consumption of the mobile station apparatus increases due to multiple applications running all the time on the mobile station apparatus and to improve efficiency of radio resource use consumed by the applications in EUTRA and Advanced EUTRA (NPL 1).

CITATION LIST

Non Patent Literature

NPL 1: 3GPP TR 36.822 V0.2.0 (2011-11) LTE RAN Enhancements for Diverse Data Applications

DISCLOSURE OF THE INVENTION

Problems to be Solved by the Invention

The mobile station apparatus in EUTRA is provided with a radio resource request (also referred to as a scheduling request (SR)) procedure for requesting uplink radio resources. In addition, the mobile station apparatus is provided with a physical uplink control channel and a physical random access channel as an uplink channel used in requesting radio resources. When uplink radio resources are required with respect to a base station apparatus, the mobile station apparatus transmits through any one of the above channels to notify the base station apparatus that uplink radio resources are required.

However, as disclosed in NPL 1, a small amount of radio resources for uplink data are actually used in light of a communication state in which applications generating a small amount of data packets (for example, a background communication (background traffic), an instant message communication, and the like) are running all the time on the mobile station apparatus. In addition, the applications do not transfer data frequently. For this reason, allocating the physical uplink control channel used in requesting radio resources to the mobile station apparatus all the time causes a problem of degrading the efficiency of radio resource use related to the physical uplink control channel. On the contrary, not allocating or allocating the physical uplink control channel used in requesting radio resources less frequently so as to improve efficiency of radio resource use causes a problem of large transmission delays since allocating radio resources for uplink data takes time.

This can be solved by requesting radio resources according to types of actual transmission. However, predicting the total amount of data packets generated by the mobile station apparatus or the base station apparatus (and upper network) or transmission and reception patterns of the data packets (transmission period, transmission interval, packet generation timing, and the like) is difficult.

In light of the above problems, an object of embodiments of the present invention is to provide a technology that is related to a terminal apparatus, a base station apparatus, a communication system, a radio resource requesting method, and an integrated circuit which can improve efficiency of radio resource use by efficiently performing a radio resource request control between a mobile station apparatus and the base station apparatus.

Means for Solving the Problems

The following solutions are devised to achieve the above object. That is, according to an embodiment of the present invention, there is provided a terminal apparatus in a communication system that includes a base station apparatus and the terminal apparatus. The terminal apparatus performs determining whether to transmit a message related to a permission to change a transmission parameter, which is configured from the base station apparatus, of a control channel used in a radio resource request to the base station apparatus on the basis of a transmission state of the control channel used in the radio resource request.

In the embodiment of the present invention, the transmission state of the control channel used in the radio resource request of the terminal apparatus may be determined on the basis of a parameter for determining the transmission state that is configured for each terminal apparatus from the base station apparatus.

In the embodiment of the present invention, the transmission state of the control channel used in the radio resource request of the terminal apparatus may be based on one piece or a combination of two or more pieces of information among information related to uplink transmission data, information on a speed of the terminal apparatus, and information related to a transmission frequency of the radio resource request.

In the embodiment of the present invention, the transmission state of the control channel used in the radio resource request of the terminal apparatus may be based on a timer that measures time after the control channel used in the radio resource request is transmitted.

In the embodiment of the present invention, the message of the terminal apparatus may indicate a permission to extend the transmission parameter of the control channel used in the radio resource request.

In the embodiment of the present invention, the message of the terminal apparatus may indicate a permission to release resources of the control channel used in the radio resource request.

According to another embodiment of the present invention, there is provided a base station apparatus in a communication system that includes the base station apparatus and a terminal apparatus. The base station apparatus performs configuring a transmission parameter of a control channel used in a radio resource request of the terminal apparatus and a parameter for determining a transmission state of the control channel used in the radio resource request to the terminal apparatus and receiving a message, which is transmitted by the terminal apparatus, related to a permission to change the transmission parameter of the control channel used in the radio resource request.

In another embodiment of the present invention, the base station apparatus may perform extending the transmission parameter of the control channel used in the radio resource request or releasing the control channel used in the radio resource request on the basis of the received message related to the permission to change the transmission parameter of the control channel used in the radio resource request.

According to still another embodiment of the present invention, there is provided a communication system that includes a base station apparatus which configures a transmission parameter of a control channel used in a radio resource request and a parameter for determining a transmission state of the control channel used in the radio resource request to the terminal apparatus and a terminal apparatus which determines whether to transmit a message related to a permission to change a transmission parameter, which is configured from the base station apparatus, of the control channel used in the radio resource request to the base station apparatus on the basis of the transmission state of the control channel used in the radio resource request.

In still another embodiment of the present invention, the base station apparatus of the communication system may configure the parameter for determining the transmission state of the control channel used in the radio resource request on the basis of the terminal apparatus performance of the terminal apparatus.

According to still another embodiment of the present invention, there is provided a radio resource requesting method in a communication system that includes a base station apparatus and a terminal apparatus. The method includes at least causing the base station apparatus to configure a transmission parameter of a control channel used in a radio resource request and a parameter for determining a transmission state of the control channel used in the radio resource request to the terminal apparatus and causing the terminal apparatus to determine whether to transmit a message related to a permission to change the transmission parameter, which is configured from the base station apparatus, of the control channel used in the radio resource request to the base station apparatus on the basis of the transmission state of the control channel used in the radio resource request.

According to still another embodiment of the present invention, there is provided an integrated circuit of a terminal apparatus in a communication system that includes a base station apparatus and the terminal apparatus. The integrated circuit causes the terminal apparatus to exhibit a series of functions in determining whether to transmit a message related to a permission to change a transmission parameter, which is configured by the base station apparatus, of a control channel used in a radio resource request to the base station apparatus on the basis of a transmission state of the control channel used in the radio resource request of the terminal apparatus.

In the present specification, each embodiment will be disclosed as a technology related to a terminal apparatus, a base station apparatus, a communication system, a radio resource requesting method, and an integrated circuit that realize an efficient radio resource request control. However, communication schemes that are applicable to each embodiment are not limited to EUTRA or communication schemes that have upper compatibility to EUTRA such as Advanced EUTRA.

For example, a technology described in the present specification may be used in various communication systems such as a code division multiple access (CDMA) system, a time division multiple access (TDMA) system, a frequency division multiple access (FDMA) system, an orthogonal FDMA (OFDMA) system, a single carrier FDMA (SC-FDMA) system, and other systems. In addition, a system and a network may be used synonymously with each other in the present specification.

A technology in which frequencies (component carriers or frequency bands) with multiple different frequency bands are integrated (aggregated) to be handled as one frequency (frequency band) by a carrier aggregation may be applied to the mobile station apparatus and the base station apparatus. The component carrier includes an uplink component carrier that corresponds to an uplink and a downlink component carrier that corresponds to a downlink.

For example, when five component carriers with a frequency bandwidth of 20 MHz are integrated by the carrier aggregation, the mobile station apparatus that is capable of the carrier aggregation transmits and receives, regarding these component carriers as having one 100-MHz frequency bandwidth. Component carriers to be integrated may be continuous frequencies or frequencies that are all discontinuous or are partially discontinuous. For example, when usable frequency bands are an 800-MHz band, a 2.4-GHz band, and a 3.4-GHz band, a component carrier may be transmitted with the 800-MHz band, another component carrier with the 2-GHz band, and still another component carrier with the 3.4-GHz band.

Continuous or discontinuous multiple component carriers with the same frequency band may also be integrated. The frequency bandwidth of each component carrier may be a frequency bandwidth which is narrower than a receivable frequency bandwidth (for example, 20 MHz) of the mobile station apparatus, and each frequency bandwidth may be different from each other. The frequency bandwidth is desirably the same as any frequency bandwidth of a cell of the related art in light of backward compatibility. The number of uplink component carriers allocated (configured or added) in the mobile station apparatus by the base station apparatus is desirably the same as or smaller than the number of downlink component carriers.

Effects of the Invention

According to the embodiments of the present invention, a technology related to a terminal apparatus, a base station apparatus, a communication system, a radio resource requesting method, and an integrated circuit that can improve efficiency of radio resource use by efficiently performing a radio resource request control between a mobile station apparatus and the base station apparatus can be provided

BEST MODE FOR CARRYING OUT THE INVENTION

Figure 1:
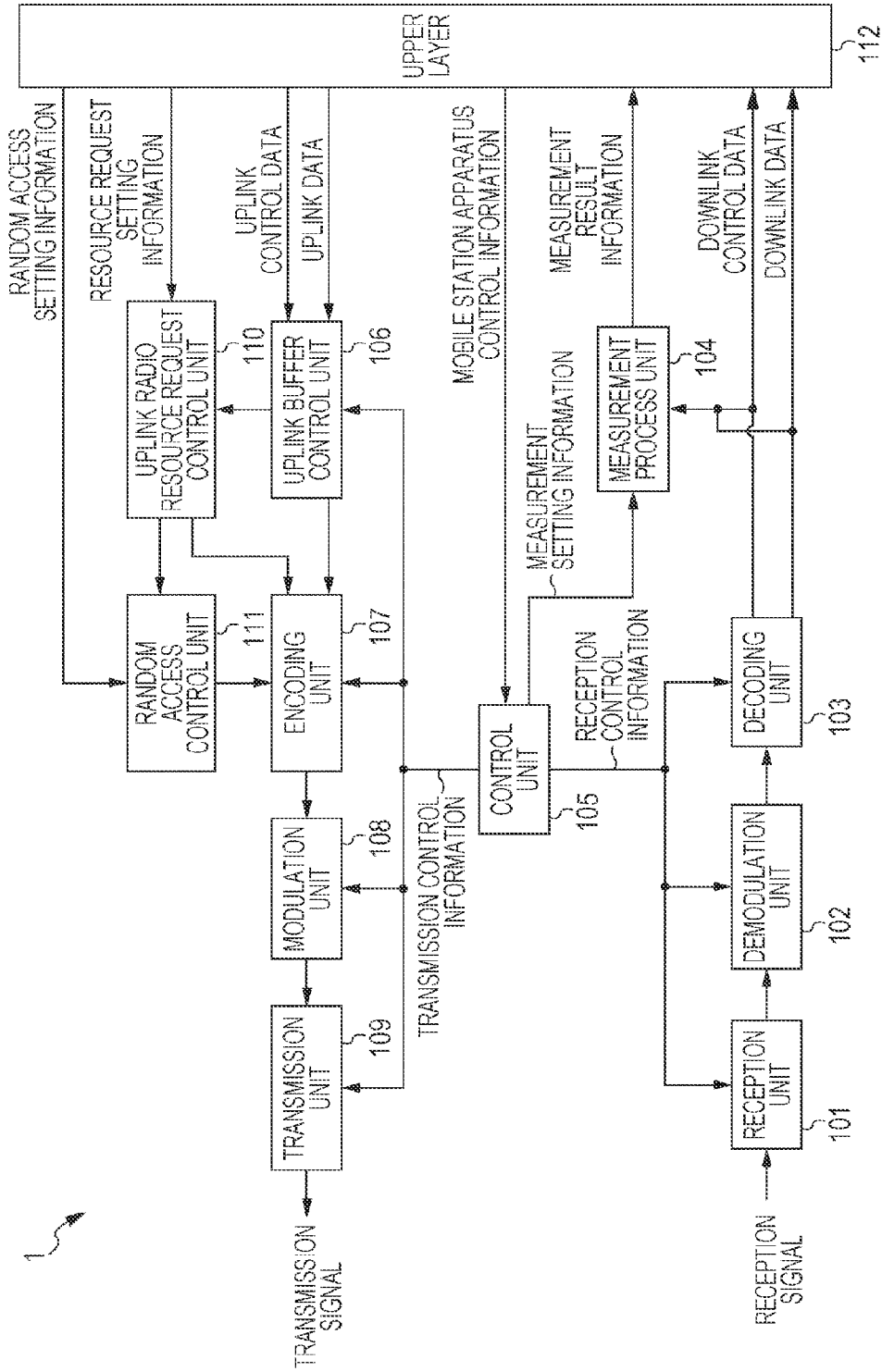
FIG. 1 is a block diagram illustrating a schematic configuration of a mobile station apparatus according to embodiments of the present invention.

Technologies related to each embodiment of the present invention will be briefly described as follows before describing each embodiment of the present invention.

[Physical Channel/Physical Signal]

Main physical channels and physical signals used in EUTRA and Advanced EUTRA will be described. A channel means a medium used in transmitting signals, and a physical channel means a physical medium used in transmitting signals. A physical channel may be further added, or the structure or format type thereof may be changed or added in EUTRA and Advanced EUTRA. However, the description of each embodiment of the present invention is not affected even with change or addition above.

Radio frames are used to manage scheduling of physical channels and physical signals in EUTRA and Advanced EUTRA. One radio frame is 10 ms, and 10 subframes constitute one radio frame. Furthermore, two slots constitute one subframe (that is, one subframe is 1 ms, and one slot is 0.5 ms). In addition, resource blocks are used as a minimum unit to manage scheduling where physical channels are arranged. A resource block is defined to have two domains of which a constant frequency domain is configured to have a configuration of multiple subcarriers (for example, 12 subcarriers) on a frequency axis, and a time domain is configured to have a constant transmission time interval (one slot).

A synchronization signal is configured to have three types of a primary synchronization signal and a secondary synchronization signal configured of 31 types of codes arranged differently to each other in the frequency domain. Combinations of a primary synchronization signal and a secondary synchronization signal indicate 504 types of a cell identifier (physical cell ID (physical cell identity; PCI)) and a frame timing for radio synchronization. A mobile station apparatus specifies a cell ID of a received synchronization signal by performing a cell search.

A physical broadcast channel (PBCH) is transmitted to notify of control parameters (broadcast information; system information) in a cell that are used in common in the mobile station apparatus. For any broadcast information that is not notified via the physical broadcast channel, radio resources are notified via a physical downlink control channel, and the broadcast information that is not notified is transmitted in a layer 3 message (system information) via a physical downlink shared channel. A cell global identifier (CGI) that indicates an individual cell identifier, a tracking area identifier (TAI) that manages a waiting area by paging, random access configuration information (transmission timing timer and the like), common radio resource configuration information, and the like are notified as the broadcast information.

Downlink reference signals are classified as multiple types according to the applications thereof. For example, a cell-specific reference signal (cell-specific RS) is a pilot signal transmitted with predetermined power for each cell and is a downlink reference signal periodically repeated according to a predetermined rule in the frequency domain and the time domain. The mobile station apparatus measures reception quality for each cell by receiving the cell-specific RS. In addition, the mobile station apparatus uses a downlink cell-specific RS as a reference signal transmitted with the cell-specific RS at the same time for demodulating a physical downlink control channel or a physical downlink shared channel. Identifiable sequences for each cell are used as sequences used in the cell-specific RS.

Downlink reference signals are also used in estimating a propagation fluctuation of a downlink. The downlink reference signals used in estimating a propagation fluctuation is referred to as channel state information reference signals (CSI-RS). In addition, downlink reference signals that are individually configured for each mobile station apparatus are referred to as UE-specific reference signals (URS) or dedicated RS (DRS) and are referenced for a channel compensation process when a physical downlink control channel or a physical downlink shared channel is demodulated.

A physical downlink control channel (PDCCH) is transmitted using a few OFDM symbols (for example, one to four OFDM symbols) from the start of each subframe and is used for indicating radio resource allocation information according to the scheduling by a base station apparatus with respect to the mobile station apparatus or the adjustment amount of increase and decrease of transmission power. The mobile station apparatus monitors the physical downlink control channel allocated thereto prior to transmitting and receiving a layer 3 message (paging, handover command, and the like), which is downlink data or downlink control data, and receives the physical downlink control channel allocated thereto. For this reason, the mobile station apparatus is required to obtain the radio resource allocation information, which is referred to as uplink grant in case of transmitting or downlink grant (downlink assignment) in case of receiving, from the physical downlink control channel. Besides being transmitted using the above OFDM symbols, the physical downlink control channel may be transmitted in the resource block area that are dedicatedly allocated by the base station apparatus with respect to the mobile station apparatus.

A physical uplink control channel (PUCCH) is used to perform an acknowledgement response (acknowledgement/negative acknowledgement; ACK/NACK) of reception of data that is transmitted using the physical downlink shared channel, downlink channel (channel state) information (channel state information; CSI), or a scheduling request (SR) that is an uplink radio resource allocation request (radio resource request). CSI includes a channel quality indicator (CQI), a precoding matrix indicator (PMI), a precoding type indicator (PTI), and a rank indicator (RI). Each indicator may be expressed as an indication, but the application and meaning of the indication are the same as those of the indicator.

The physical downlink shared channel (PDSCH) is also used to notify of paging or broadcast information (system information) that is not notified the mobile station apparatus by the physical broadcast channel as a layer 3 message besides the downlink data. Radio resource allocation information of the physical downlink shared channel is indicated in the physical downlink control channel. The physical downlink shared channel is arranged in OFDM symbols other than the OFDM symbols where the physical downlink control channel is transmitted and then transmitted. That is, the physical downlink shared channel and the physical downlink control channel are time-division multiplexed in one subframe.

A physical uplink shared channel (PUSCH) mainly transmits uplink data and uplink control data, and may include control data such as downlink reception quality. ACK/NACK, and the like. In addition, the physical uplink shared channel is used to notify of uplink control information as a layer 3 message to the base station apparatus besides the uplink data. Radio resource allocation information of the physical uplink shared channel is indicated in the physical downlink control channel similarly to the downlink.

Uplink reference signals (also referred to as uplink pilot signals or uplink pilot channels) include demodulation reference signals (DMRS) used by the base station apparatus for demodulating the physical uplink control channel (PUCCH) and/or the physical uplink shared channel (PUSCH) and sounding reference signals (SRS) used by the base station apparatus for mainly estimating the uplink channel state. The sounding reference signals include periodic sounding reference signals (periodic SRS) and aperiodic sounding reference signals (aperiodic SRS).

A physical random access channel (PRACH) is a channel used for notifying of preamble sequences and includes a guard time. The preamble sequences are configured to express six-bit information using 64 types of sequence. The physical random access channel is used by the mobile station apparatus to access the base station apparatus. The mobile station apparatus uses the physical random access channel to request the base station apparatus to send a radio resource request when the physical uplink control channel is not configured or transmission timing adjustment information (also referred to as timing advance (TA)) that is required to adjust an uplink transmission timing to a reception timing window of the base station apparatus.

Specifically, the mobile station apparatus transmits the preamble sequences by using radio resources for the physical random access channel configured by the base station apparatus. After receiving the transmission timing adjustment information, the mobile station apparatus configures a transmission timing timer (TA timer) that measures the valid time of the transmission timing adjustment information which is configured in common by the broadcast information (or is individually configured by a layer 3 message). The mobile station apparatus then manages the uplink state as a transmission timing adjustment state that is during the valid time of the transmission timing timer (while the transmission timing timer measures the time) and a transmission timing non-adjustment state (state of not adjusting the transmission timing) except the valid time (while the transmission timing timer stops measuring the time). A layer 3 message is a control-plane message that is exchanged in the RRC (radio resource control) layer of the mobile station apparatus and the base station apparatus and is used synonymously with RRC signaling or an RRC message. Any physical channels other than the above ones will not be described in detail since those channels are irrelevant to each embodiment of the present invention.

[Radio Network]

Each communicable range of frequencies controlled by the base station apparatus is regarded as a cell. At this time, each area (cell) covered by the frequencies may have a different width and a different shape. In addition, each frequency may cover a different area. The mobile station apparatus operates in a cell. When moving from one cell to another cell, the mobile station apparatus follows a cell reselection procedure in case of non-radio connection (while not communicating) or a handover procedure in case of radio connection (while communicating) to move to another preferable cell. The preferable cell here generally indicates a cell with the highest reception quality that the mobile station apparatus is not prohibited from accessing.

Carrier aggregation is a form of communication between multiple cells using multiple component carriers (frequency bands) and the mobile station apparatus and is also referred to as cell aggregation. The mobile station apparatus may be radio-connected to the base station apparatus via relay apparatuses (or repeaters) for each frequency. That is, the base station apparatus in each embodiment of the present invention can be replaced with the relay apparatus.

A base station apparatus defined by 3GPP is referred to as a nodeB, and a base station apparatus in EUTRA and Advanced EUTRA is referred to as an eNodeB. In addition, a mobile station apparatus defined by 3GPP in EUTRA and Advanced EUTRA is referred to as a user equipment (UE). The base station apparatus manages cells, which are communicable areas of the mobile station apparatus with respect to the base station apparatus, for each frequency. The cell is also referred to as a microcell, a femtocell, a picocell, and a nanocell depending on the size of the communicable area with respect to the mobile station apparatus. In addition, when the mobile station apparatus is communicable to a base station apparatus, a cell used in communication with the mobile station apparatus is referred to as a serving cell, and other cells around the serving cell are referred to as neighboring cells among the cells of the base station apparatus.

[Radio Resource Request (Scheduling Request)]

The following two radio resource requesting methods are prepared as a method for initiating uplink data transmission from the mobile station apparatus to the base station apparatus in EUTRA. A first radio resource requesting method is a method in which the mobile station apparatus uses the physical uplink control channel to perform a radio resource request (request for transmitting the uplink grant) to the base station apparatus when the base station apparatus allocates a setting (configuration) related to transmission resources of the physical uplink control channel required for the radio resource request to the mobile station apparatus.

In the first radio resource requesting method, the mobile station apparatus performs the radio resource request by transmitting the physical uplink control channel (hereinafter, referred to as SR-PUCCH) that is used in the radio resource request to the base station apparatus when uplink data is retained in a uplink buffer, and the physical uplink shared channel (uplink grant) for transmitting the uplink data is not allocated. At this time, a transmission counter of the physical uplink control channel is incremented, and an SR prohibit timer starts to measure time according to the configuration. The mobile station apparatus does not transmit the SR-PUCCH when the SR prohibit timer is running.

The mobile station apparatus periodically transmits SR-PUCCH until the physical uplink shared channel (uplink grant) is allocated. However, when the uplink grant is not received from the base station apparatus even until the number of SR-PUCCH transmission reaches the maximum number, resources of the physical uplink control channel are released, and a second radio resource requesting method is initiated. The mobile station apparatus is in a transmission timing adjustment state in the first radio resource requesting method.

The second radio resource requesting method is performed (1) when the mobile station apparatus is in the transmission timing adjustment state, but the base station apparatus does not allocate an uplink shared channel required for performing the radio resource request to the mobile station apparatus, or (2) when the TA timer is in a non-operation state (transmission timing non-adjustment state). The second radio resource requesting method is a method in which the mobile station apparatus performs the radio resource request using the physical random access channel with respect to the base station apparatus.

In light of the respects described above, preferable embodiments of the present invention will be described below in detail with reference to the accompanying drawings. However, when it is determined that specific descriptions on known functions or configurations related to the embodiments of the present invention make the gist of the embodiments of the present invention unclear in the description of the embodiments of the present invention, detailed descriptions thereof will be omitted.

First Embodiment

A first embodiment of the present invention will be described below. The present embodiment relates to a radio resource requesting method of a mobile station apparatus 1 and particularly describes a radio resource requesting method based on the determination at the state where a method for requesting radio resources when the mobile station apparatus 1 is communicating is determined.

FIG. 1 is a block diagram illustrating an example of the mobile station apparatus 1 according to the first embodiment of the present invention. The mobile station apparatus 1 is comprising a reception unit 101, a demodulation unit 102, a decoding unit 103, a measurement process unit 104, a control unit 105, an uplink buffer control unit 106, an encoding unit 107, a modulation unit 108, a transmission unit 109, an uplink radio resource request control unit 110, a random access control unit 111, and an upper layer 112. The upper layer 112 is a block that realizes a certain function of a radio resource control (RRC) layer which controls radio resources. The uplink buffer control unit 106, the uplink radio resource request control unit 110, and the random access control unit 111 are blocks that realize certain functions of a medium access control (MAC) layer which manages a data link layer.

The mobile station apparatus 1 may include multiple reception system blocks (the reception unit 101, the demodulation unit 102, and the decoding unit 103) for supporting simultaneous reception of multiple frequencies (frequency bands or frequency bandwidths) by a carrier aggregation and multiple transmission system blocks (the encoding unit 107, the modulation unit 108, and the transmission unit 109) for supporting simultaneous transmission of the multiple frequencies (frequency bands or frequency bandwidths).

Reception-related mobile station apparatus control information is input to the control unit 105 by the upper layer 112. The mobile station apparatus control information is information that is configured by reception control information and transmission control information and is required for the mobile station apparatus 1 to control radio communication. The mobile station apparatus control information is configured by a radio connection resource configuration that is individually transmitted from a base station apparatus 2, cell-specific broadcast information, or a system parameter and is input to the control unit 105 by the upper layer 112 when necessary. The control unit 105 appropriately inputs the reception control information, which is reception-related control information, to the reception unit 101, the demodulation unit 102, and the decoding unit 103. Besides information on the reception frequency band, the reception control information includes a reception timing related to each channel, a multiplexing method, radio resource arrangement information, and the like. In addition, the control unit 105 inputs measurement configuration information used in determining a measurement event whether the measurement result of the mobile station apparatus 1 is fulfilled the specified measurement event to the measurement process unit 104. The measurement configuration information can include multiple types of different measurement events. Different measure events for each cell or each frequency may be configured from the base station apparatus 2 in the measurement configuration information.

A reception signal is received in the reception unit 101. The reception unit 101 receives a signal in a frequency band specified in the reception control information. The received signal is input to the demodulation unit 102. The demodulation unit 102 demodulates the reception signal, inputs the signal to the decoding unit 103 to correctly decode the downlink data and the downlink control data, and inputs each decoded data to the upper layer 112. Each data is also input to the measurement process unit 104.

The measurement process unit 104 creates measurement result information on the basis of measurement values of the downlink reference signal reception quality (SIR, SINR, RSRP, RSRQ, RSSI, path loss, and the like) for each cell (component carrier) and the reception error rate measurement result of the physical downlink control channel or the physical downlink shared channel. The measurement process unit 104 also uses the measurement result as a parameter for determining whether the configured measurement event is established. In addition, the measurement process unit 104 inputs the measurement result to the upper layer 112 as the measurement result information. In addition, the measurement process unit 104 notifies of a measurement event result that indicates the content of the established measurement event as the measurement result information to the upper layer 112 when one or more measurement events configured are established (that is, when the configured measurement event condition is satisfied). In addition, the measurement process unit 104 notifies of the measurement event result that indicates the content of the measurement event not established as the measurement result information to the upper layer 112 when the measurement event that is once established is not established (that is, when the configured measurement event condition is not satisfied).

Transmission-related mobile station apparatus control information that is a control parameter for controlling each block is input to the control unit 105 by the upper layer 112. The transmission control information that is transmission-related control information is appropriately input to the uplink buffer control unit 106, the encoding unit 107, the modulation unit 108, and the transmission unit 109. The transmission control information includes encoding information, modulation information, transmission frequency band information, transmission timing related to each channel, multiplexing method, radio resource arrangement information, and the like as uplink scheduling information of a transmission signal.

The random access configuration information is input to the random access control unit 111 by the upper layer 112. The random access configuration information includes preamble information, radio resource information (power adjustment parameter, maximum preamble retransmission number, and the like) for transmitting the physical random access channel, and the like. The upper layer 112 manages transmission timing adjustment information and the transmission timing timer used in adjusting the uplink transmission timing and manages an uplink transmission timing state (transmission timing adjustment state or transmission timing non-adjustment state) for each cell (alternatively, for each cell group or TA group). The transmission timing adjustment information and the transmission timing timer are included in the transmission control information.

The upper layer 112 manages the transmission timing adjustment information corresponding to each uplink transmission timing of the multiple cells (alternatively, cell groups or TA groups) when the multiple uplink transmission timing states are necessary to be managed.

Transmission data (uplink data and uplink control data) is input to the uplink buffer control unit 106 at an arbitrary timing by the upper layer 112. At this time, the uplink buffer control unit 106 calculates the amount of input transmission data (amount of uplink buffer). Resource request configuration information is configured in the uplink radio resource request control unit 110 by the upper layer 112. The resource request configuration information includes at least transmission counter configuration information and radio resource request prohibit timer information. The uplink buffer control unit 106 informs that transmission data resides in the uplink buffer by announcing occurrence of the transmission data to the uplink radio resource request control unit 110 when the transmission data is input to the uplink buffer control unit 106.

The uplink radio resource request control unit 110 determines whether radio resources required for transmitting the input transmission data are allocated. The uplink radio resource request control unit 110 selects one of the physical uplink shared channel (PUSCH), a radio resource request by the physical uplink control channel (SR-PUCCH), and the physical random access channel and requests the encoding unit 107 and/or the random access control unit 111 to perform a control process for transmitting the selected channel on the basis of the radio resource allocation.

That is, the encoding unit 107 obtains and encodes the transmission data corresponding to the allocated radio resources from the uplink buffer control unit 106 in accordance with instructions from the uplink radio resource request control unit 110 and outputs the encoded transmission data to the modulation unit 108 at a state where radio resources are already allocated, and the transmission data is transmittable to the physical uplink shared channel (PUSCH). Alternatively, the encoding unit 107 encodes the control data required for transmitting SR-PUCCH in accordance with instructions from the uplink radio resource request control unit 110 and outputs the encoded transmission data to the modulation unit 108 when radio resources are not allocated, and the radio resource request by the physical uplink control channel (SR-PUCCH) is possible.

Alternatively, the encoding unit 107 instructs the random access control unit 111 to initiate a random access procedure when radio resources are not allocated, and the radio resource request by the physical uplink control channel (SR-PUCCH) is not available. At this time, the encoding unit 107 creates a preamble sequence that is transmitted via the physical random access channel on the basis of random access data information input from the random access control unit 111. In addition, the encoding unit 107 appropriately encodes each data and outputs the encoded data to the modulation unit 108 in accordance with the transmission control information.

The modulation unit 108 appropriately performs a modulation process on the basis of the structure of the channel via which the output from the encoding unit 107 is transmitted. The transmission unit 109 maps the output of the modulation unit 108 to the frequency domain, converts the signal in the frequency domain to a signal in the time domain, and performs power amplification by superimposing the converted signal on a carrier wave with a predetermined frequency. The transmission unit 109 adjusts the uplink transmission timing in accordance with the transmission timing adjustment information input by the upper layer 112 for each cell (alternatively, for each cell group or TA group). The physical uplink shared channel where the uplink control data is arranged can also include, for example, a layer 3 message (radio resource control message: RRC message) besides user data.

In FIG. 1, other constituents of the mobile station apparatus 1 are omitted since those constituents are not particularly strongly related to the present embodiment. However, the mobile station apparatus 1 apparently includes multiple blocks having other functions required for operation of the mobile station apparatus 1 as the constituents.

Figure 2:
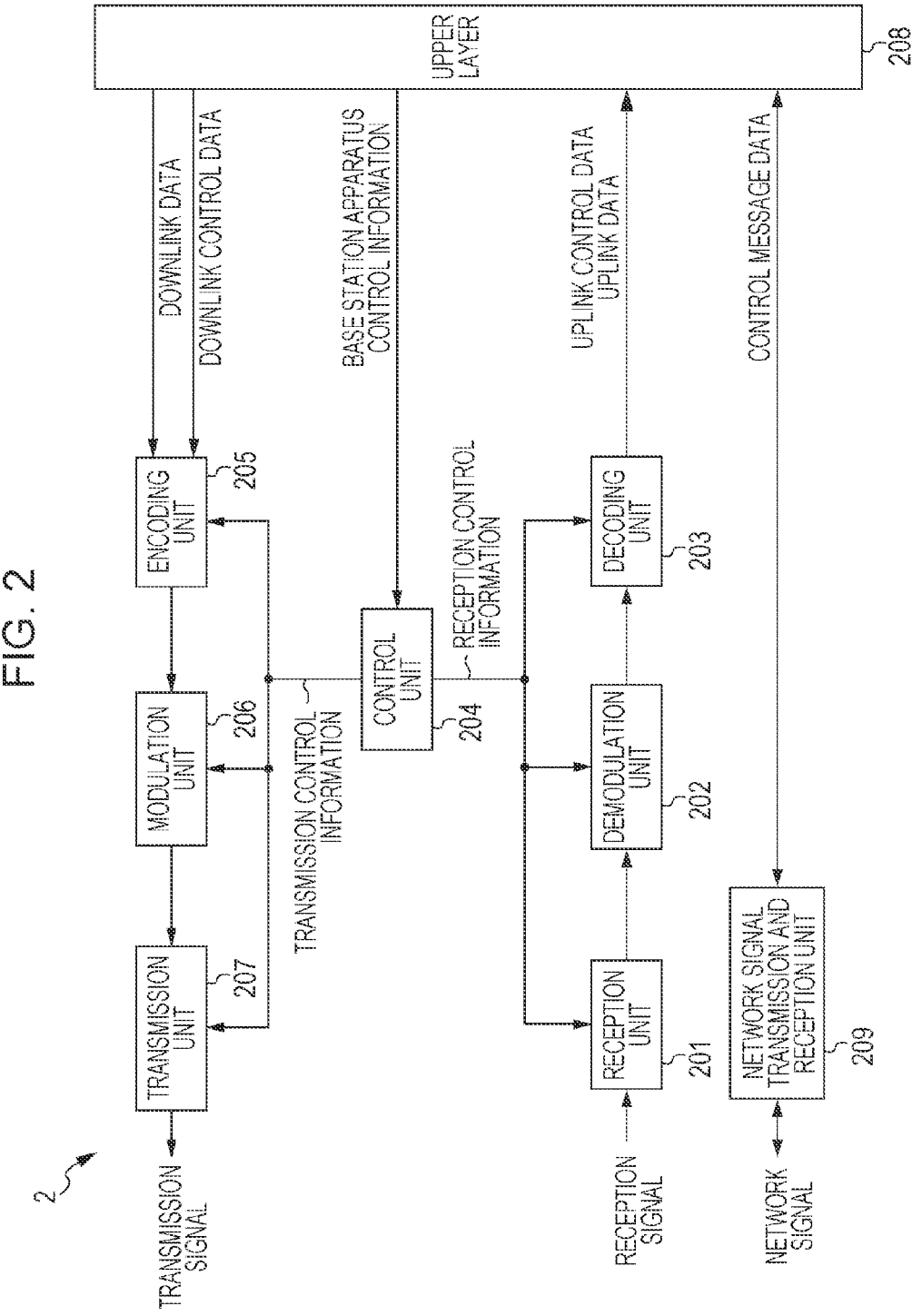
FIG. 2 is a block diagram illustrating a schematic configuration of a base station apparatus according to embodiments of the present invention.

FIG. 2 is a block diagram illustrating an example of the base station apparatus 2 according to the first embodiment of the present invention. The base station apparatus is comprising a reception unit 201, a demodulation unit 202, a decoding unit 203, a control unit 204, an encoding unit 205, a modulation unit 206, a transmission unit 207, an upper layer 208, and a network signal transmission and reception unit 209. In addition, the base station apparatus 2 may include multiple reception system blocks (the reception unit 201, the demodulation unit 202, and the decoding unit 203) and multiple transmission system blocks (the encoding unit 205, the modulation unit 206, and the transmission unit 207) for supporting multiple frequencies (frequency bands or frequency bandwidths).

The upper layer 208 inputs the downlink data and the downlink control data to the encoding unit 205. The encoding unit 205 encodes the input data and inputs the encoded data to the modulation unit 206. The modulation unit 206 modulates the encoded signal. In addition, the signal output from the modulation unit 206 is input to the transmission unit 207. The transmission unit 207 maps the input signal to the frequency domain, then converts the signal in the frequency domain to a signal in the time domain, and performs power amplification to transmit by superimposing the converted signal on a carrier wave with a predetermined frequency. The physical downlink shared channel where the downlink control data is arranged typically constitutes a layer 3 message (RRC message).

The reception unit 201 converts the signal received from the mobile station apparatus 1 to a baseband digital signal. When cells with multiple different transmission timings are configured for the mobile station apparatus 1, the reception unit 201 receives a signal for each cell (alternatively, for each cell group or TA group) at a different timing. The digital signal converted in the reception unit 201 is input to the demodulation unit 202 and is demodulated. The signal demodulated in the demodulation unit 202 is subsequently input to the decoding unit 203 and is decoded. The correctly decoded uplink control data or the uplink data is output to the upper layer 208.

Base station apparatus control information required for controlling each block above is information that is configured by the reception control information and the transmission control information and is required for the base station apparatus 2 to control the radio communication. The base station apparatus control information is configured by an upper network apparatus (MME, gateway apparatus, or OAM) or system parameters and is input to the control unit 204 by the upper layer 208 when necessary.

The control unit 204 appropriately inputs the transmission-related base station apparatus control information to each block of the encoding unit 205, the modulation unit 206, and the transmission unit 207 as the transmission control information and inputs the reception-related base station apparatus control information to each block of the reception unit 201, the demodulation unit 202, and the decoding unit 203 as the reception control information. RRC of the base station apparatus 2 is a part of the upper layer 208.

The network signal transmission and reception unit 209 transmits (transports) or receives control messages or user data between the base station apparatuses 2 or between the upper network apparatus and the base station apparatus 2. In FIG. 2, other constituents of the base station apparatus 2 are omitted since those constituents are not particularly strongly related to the present embodiment. However, the base station apparatus 2 apparently includes multiple blocks having other functions required for operation of the base station apparatus 2 as the constituents.

Figure 3:
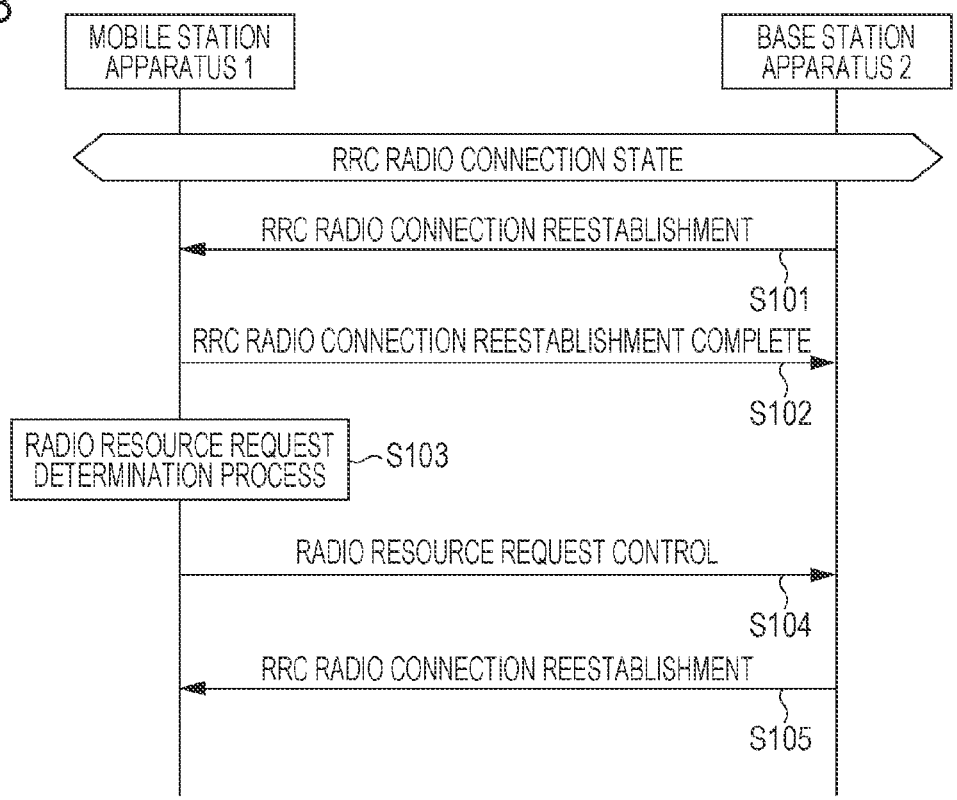
FIG. 3 is a sequence chart diagram illustrating an example of operation of a mobile station apparatus and a base station apparatus according to a first embodiment of the present invention.

FIG. 3 is a sequence chart diagram illustrating exchange of information related to the radio resource request control between the mobile station apparatus 1 and the base station apparatus 2 in the present embodiment.

The mobile station apparatus 1 receives the physical broadcast channel transmitted from the base station apparatus 2 and selects a suitable cell on the basis of information of the physical broadcast channel. The suitable cell generally has the reception quality thereof higher than the neighboring cells and indicates a cell that the mobile station apparatus is not restricted to access. The mobile station apparatus 1 that camped on the suitable cell transitions to an RRC radio connection state (also referred to as a connected state) when it is necessary to transmit arbitrary data (user data by applications, control data related to the handover, or the like) caused by the occurrence of the uplink transmission data to the base station apparatus 2. The mobile station apparatus 1 performs the random access procedure to transition the state of RRC from an RRC radio non-connection state (also referred to as an idle state) to the RRC radio connection state that is the state during communication.

The mobile station apparatus 1 and the base station apparatus 2 in FIG. 3 start from a state where the random access procedure is succeeded, and radio connection is made via at least one cell. In addition, a transmission parameter related to SR-PUCCH is not individually (that is, for each mobile station apparatus 1) configured in the mobile station apparatus 1. That is, the configuration related to SR-PUCCH of the mobile station apparatus 1 is in one of a state where any configuration is not configured, an initial configuration state, and a state where a configuration related to cell-specific SR-PUCCH is configured (a state where a common configuration related to SR-PUCCH is applied to the mobile station apparatus 1 of the cell).

At this time, the base station apparatus 2 transmits an RRC radio connection reconfiguration message to the mobile station apparatus 1 (Step S101). The RRC radio connection reconfiguration message is desirably transmitted using a RRC message (layer 3 message). The base station apparatus 2 individually configures a parameter required for transmitting SR-PUCCH in the RRC radio connection reconfiguration message for each mobile station apparatus 1 and transmits the RRC radio connection reconfiguration message.

The mobile station apparatus 1 configures a parameter (transmission parameter) required for transmitting SR-PUCCH on the basis of the RRC radio connection reconfiguration message and transmits an RRC radio connection reconfiguration complete message to the base station apparatus 2 when the configuration is completed (Step S102). The RRC radio connection reconfiguration complete message is desirably transmitted using a RRC message (layer 3 message).

Subsequently, the mobile station apparatus 1 initiates a radio resource request determination process (Step S103). The radio resource request determination process is a determination process in which the mobile station apparatus 1 determines (decides or detects) the state of the mobile station apparatus 1 (a predetermined state) and notifies whether extension is applicable (allowable) to the configuration related to SR-PUCCH to the base station apparatus 2. Extending the configuration related to SR-PUCCH means applying a parameter value, that is different from current values and is added to improve the efficiency of radio resource utilization, to one or multiple parameters among the multiple parameters required for transmitting SR-PUCCH. That is, it should be noted that the transmission format of SR-PUCCH itself or the structure of the physical channel is not modified in the first embodiment.

For example, the mobile station apparatus 1 performs the radio resource request determination process on the basis of information related to the uplink transmission data, information on the speed of the mobile station apparatus 1, information related to the transmission frequency of the radio resource request, and the like. More specifically, the mobile station apparatus 1 may use one or multiple pieces of information among the average and/or the maximum amount of the uplink buffer in a certain time, the retransmission number in a certain time, the average and/or the maximum uplink throughput in a certain time, the average and/or the maximum downlink throughput in a certain time, the average and/or the maximum amount of the uplink packet (packet size) in a certain time, the average and/or the maximum amount of the downlink packet (packet size) in a certain time, the average and/or the maximum transmission power in a certain time, the estimation of the mobility speed of the mobile station apparatus 1 at a certain time, and a predicted time until uplink radio resources are required at a certain time (an expected time until the next SR-PUCCH transmission) as a parameter for the radio resource request determination process.

For example, the mobile station apparatus 1 may determine that the extension of the configuration related to SR-PUCCH is allowable when the mobile station apparatus 1 is currently in a state where the average amount of the uplink buffer in a certain time is smaller than a predetermined threshold, and the mobility speed based on the estimation of the mobility speed is a low speed. Alternatively, for example, the mobile station apparatus 1 may determine that the extension of the configuration related to SR-PUCCH is allowable when the mobile station apparatus 1 is currently in a state where the maximum amount of the uplink packet in a certain time is smaller than a predetermined threshold, and the predicted time until the uplink radio resources are required is beyond a predetermined time. Apparently, the mobile station apparatus 1 may determine by combining parameters for the radio resource request determination process other than the described ones above.

The base station apparatus 2 may configure a part or all of the parameters for the radio resource request determination process described above in the mobile station apparatus 1 so that the mobile station apparatus 1 can determine whether the configuration related to the extension of SR-PUCCH (hereinafter, referred to as enhanced SR-PUCCH) is applicable. The base station apparatus 2 may configure specific values for each parameter or may configure only for parameters used in the radio resource request determination process. Index information that indicates a set of the parameters that are used may be configured when the parameters are configured from the base station apparatus 2. In addition, the mobile station apparatus 1 may autonomously configure the value of the parameters used in the radio resource request determination process when only the parameters used in the radio resource request determination process are configured.

The base station apparatus 2 may configure a part or all of the parameters of the radio resource request determination process described above to the mobile station apparatus 1 to cause the mobile station apparatus 1 to start monitoring the state of the mobile station apparatus 1 for determining that the extension of SR-PUCCH is allowable. The mobile station apparatus 1 may start monitoring the state of the mobile station apparatus 1 when the part or all of the parameters for the radio resource request determination process described above are configured from the base station apparatus 2 and may determine whether the extension of SR-PUCCH is allowable. The mobile station apparatus 1 monitors the state of the mobile station apparatus 1 using information obtained from each function block.

In addition, the parameters used in the radio resource request determination process may be uniquely determined in a communication system. The base station apparatus 2 may notify the parameters used in the radio resource request determination process for each cell using the broadcast information. The mobile station apparatus 1 compares the parameters configured from the base station apparatus 2 with the current state of the mobile station apparatus 1 and determines that the extension of the configuration related to SR-PUCCH is allowable when the current state of the mobile station apparatus 1 satisfies a state indicated by the parameters configured from the base station apparatus 2.

Alternatively, the mobile station apparatus 1 may perform the radio resource request determination process (Step S103) on the basis of information from the higher layer that manages information provided in the OS (operating system), the application layer, or the network layer (hereinafter, these layers will be collectively referred to as a non access stratum (NAS) layer) such as types of traffic (types of the application) in the current communication of the mobile station apparatus 1, an expected time until data transmission is completed, and QoS. Hereinafter, the information instructed from the NAS layer will be described by referring to the information as NAS layer information.

The NAS layer information indicates, for example, that the possibility of SR-PUCCH transmission is low or high. Alternatively, the NAS layer information indicates that the configuration related to enhanced SR-PUCCH is allowable or not allowable. Alternatively, the NAS layer information indicates that the frequency of the radio resource request is low or high. Alternatively, the NAS layer information indicates that the radio resource request can be delayed or not be delayed. Alternatively, the NAS layer information indicates that uplink radio resources required for one transmission may be small, or large radio resources are required. Alternatively, the NAS layer information indicates that restricted radio resources can be allocated or not be allocated in the present communication. Alternatively, the NAS layer information indicates types of traffic in the present communication. Alternatively, the NAS layer information indicates the bit rate in the present communication. Alternatively, the NAS layer information indicates the predicted communication time in the present communication.

The mobile station apparatus 1 executes the radio resource request determination process (Step S103) on the basis of one or multiple pieces of information (NAS layer information) instructed from the NAS layer. In this case, the radio resource request determination process is a process of determining whether to notify the NAS layer information to the base station apparatus 2. Determining whether to notify the NAS layer information in the mobile station apparatus 1 to the base station apparatus 2 is performed on the basis of whether one or multiple pieces of announced NAS layer information are information indicating that release of SR-PUCCH is allowed.

For example, the mobile station apparatus 1 determines to notify the NAS layer information to the base station apparatus 2 when the NAS layer information indicates that the possibility of SR-PUCCH transmission is low. In addition, for example, the mobile station apparatus 1 determines to notify the NAS layer information to the base station apparatus 2 when the NAS layer information indicates that the types of traffic in the present communication is a background communication. In addition, for example, the mobile station apparatus 1 determines to notify the NAS layer information to the base station apparatus 2 when the NAS layer information indicates that the predicted communication time is comparatively long, and the bit rate is low in the present communication. When the mobile station apparatus 1 determines to notify the NAS layer information to the base station apparatus 2 in Step S103, the mobile station apparatus 1 then determines that a radio resource request control message is necessary to be notified to the base station apparatus 2.

Meanwhile, the mobile station apparatus 1 stops the process when the NAS layer information is not necessary to be notified to the base station apparatus 2 in Step S103. For example, when the mobile station apparatus 1 determines that the cell of the base station apparatus 2 does not support the notification of the NAS layer information on the basis of the cell-specific information indicated in the broadcast information of the base station apparatus 2, the mobile station apparatus 1 then determines that the radio resource request control message is not necessary to be notified to the base station apparatus 2. In addition, for example, the mobile station apparatus 1 determines not to notify the NAS layer information to the base station apparatus 2 when the NAS layer information indicates that the possibility of SR-PUCCH transmission is high. In addition, for example, the mobile station apparatus 1 determines not to notify the NAS layer information to the base station apparatus 2 when the NAS layer information indicates that the types of traffic in the present communication is a high bit rate communication (streaming and the like). In addition, for example, the mobile station apparatus 1 determines not to notify the NAS layer information to the base station apparatus 2 when the NAS layer information indicates that the predicted communication time is comparatively short, and the bit rate is high in the present communication.

Based on any radio resource request determination process described above, the mobile station apparatus 1 that determines that the extension of the configuration related to SR-PUCCH is allowable then configures information (configuration) related to enhanced SR-PUCCH in the radio resource request control message and transmits the message to the base station apparatus 2 (Step S104). The radio resource request control message is desirably transmitted using the layer 3 message or a layer 2 message, but may be transmitted using a layer 1 message. The layer 2 message is a message interpreted in the configuration task of the layer 2 and is a control command recognized in the layer 2 after decoded in the physical layer (layer 1). The L2 message in EUTRA and Advanced EUTRA is announced by the control command interpreted in an MAC layer (MAC control element or MAC control message).

The information related to enhanced SR-PUCCH here is, for example, information that indicates a transmission period time of enhanced SR-PUCCH that is appropriate for the state of the mobile station apparatus 1. Alternatively, the information related to enhanced SR-PUCCH is information on time and frequency resource allocation related to enhanced SR-PUCCH that is desirable and appropriate for the state of the mobile station apparatus 1. Alternatively, the information related to enhanced SR-PUCCH is information on code resources (spreading code or orthogonal code) related to enhanced SR-PUCCH that are desirable and appropriate for the state of the mobile station apparatus 1. Alternatively, the information related to enhanced SR-PUCCH is a value that indicates a multiple of the transmission period time of enhanced SR-PUCCH that is appropriate for the state of the mobile station apparatus 1. Alternatively, the information related to enhanced SR-PUCCH is information on a time of prohibiting SR-PUCCH transmission that is appropriate for the state of the mobile station apparatus 1. Alternatively, the information related to enhanced SR-PUCCH is the NAS layer information that is necessary to be notified to the base station apparatus 2.

These pieces of information announced using the radio resource request control message may be values that are actually applied, may be index numbers that indicate values configured in advance, or may further be pieces of information that indicate whether enhanced SR-PUCCH is applicable. In addition, the NAS layer information notified from the NAS layer may be transported as it is as the above information, or the NAS layer information may be encoded by the mobile station apparatus 1. In addition, multiple pieces of information may be simultaneously notified using the radio resource request control message. The radio resource request control message may be an indication message that does not require a response from the base station apparatus 2 or may be a request message that requires a response from the base station apparatus 2.

By receiving the radio resource request control message, the base station apparatus 2 can notice that the mobile station apparatus 1 determines (decides or detects) that the configuration related to enhanced SR-PUCCH is more appropriate than the configuration related to SR-PUCCH that is currently configured. That is, the mobile station apparatus 1 notifies to the base station apparatus 2 that the configuration related to enhanced SR-PUCCH is applicable by transmitting the radio resource request control message.

The base station apparatus 2 that receives the radio resource request control message then notifies the configuration required for transmitting enhanced SR-PUCCH to the mobile station apparatus 1 when necessary (Step S105). The base station apparatus 2 notifies the configuration related to enhanced SR-PUCCH to the mobile station apparatus 1 using the RRC radio connection reconfiguration message. The configuration related to enhanced SR-PUCCH is, for example, a configuration that indicates a different transmission period time which is longer than the transmission period time of SR-PUCCH (periodic timer). Alternatively, the configuration related to enhanced SR-PUCCH is information on time and frequency resource allocation that is different from that of SR-PUCCH. Alternatively, the configuration related to enhanced SR-PUCCH is code resources (spreading code or orthogonal code) that are different from those of SR-PUCCH.

Alternatively the configuration related to enhanced SR-PUCCH is a value that indicates a multiple of the transmission period time of SR-PUCCH. Alternatively, the configuration related to enhanced SR-PUCCH is information on a time of prohibiting enhanced SR-PUCCH transmission. Alternatively, the configuration related to enhanced SR-PUCCH is a value that indicates the maximum continuous transmission number of enhanced SR-PUCCH. Alternatively, the configuration related to enhanced SR-PUCCH is information that indicates a delay timer from the enhanced SR-PUCCH transmission to the uplink radio resource allocation by the downlink control channel.

The mobile station apparatus 1 may prioritize the configuration related to enhanced SR-PUCCH over the configuration related to SR-PUCCH when the configuration related to enhanced SR-PUCCH is notified from the base station apparatus 2. That is, the mobile station apparatus 1 may determine that only the configuration related to enhanced SR-PUCCH is valid when the configuration related to SR-PUCCH and the configuration related to enhanced SR-PUCCH are simultaneously configured.

In addition, information related to the validity/invalidity of the configuration related to enhanced SR-PUCCH that is configured may be notified the mobile station apparatus 1 from the base station apparatus 2. The base station apparatus 2 may notify the mobile station apparatus 1 of the information related to the validity/invalidity of the notified configuration related to enhanced SR-PUCCH. In addition, multiple configurations related to enhanced SR-PUCCH and information that indicates which configuration is valid among the multiple notified configurations related to enhanced SR-PUCCH may be notified the mobile station apparatus 1 from the base station apparatus 2. The base station apparatus 2 may notify the mobile station apparatus 1 of the multiple configurations related to enhanced SR-PUCCH and the information that indicates which configuration is valid among the multiple notified configurations related to enhanced SR-PUCCH.

Alternatively, the mobile station apparatus 1 may determine which configuration is prioritized between the configuration related to SR-PUCCH and the configuration related to enhanced SR-PUCCH on the basis of information notified from the base station apparatus 2 when the configuration related to enhanced SR-PUCCH is notified from the base station apparatus 2. That is, the mobile station apparatus 1 may determine that one of the configuration related to SR-PUCCH and the configuration related to enhanced SR-PUCCH is valid in accordance with the information notified from the base station apparatus 2 when the configuration related to SR-PUCCH and the configuration related to enhanced SR-PUCCH are simultaneously configured.

The mobile station apparatus 1 includes the information related to enhanced SR-PUCCH in the radio resource request control message, transmits the message to the base station apparatus 2, and notifies that the configuration related to enhanced SR-PUCCH is applicable when the configuration related to enhanced SR-PUCCH is not notified, and the configuration related to enhanced SR-PUCCH is determined to be allowable on the basis of the current state. In addition, the mobile station apparatus 1 may include the information related to enhanced SR-PUCCH in the radio resource request control message and transmit the radio resource request control message when the configuration related to enhanced SR-PUCCH is notified, and the information related to enhanced SR-PUCCH is determined to be possible to update on the basis of the current state.

In addition, the mobile station apparatus 1 may notify of information that indicates that the configuration related to enhanced SR-PUCCH is not necessary using the radio resource request control message when the configuration related to enhanced SR-PUCCH is notified, and the configuration related to enhanced SR-PUCCH is determined not to be necessary on the basis of the current state.

When a configuration that indicates a different transmission period time (referred to as a second SR-PUCCH period time) that is longer than the transmission period time of SR-PUCCH (periodic timer; referred to as a first SR-PUCCH period time) is notified as the configuration related to enhanced SR-PUCCH, the mobile station apparatus 1 applies the second SR-PUCCH period time to the SR-PUCCH transmission. In addition, when information on time and frequency resource allocation that is different from that of SR-PUCCH is notified as the configuration related to enhanced SR-PUCCH, the mobile station apparatus 1 applies the notified time and frequency resources to the SR-PUCCH transmission.

In addition, when a value that indicates a multiple of the transmission period time of SR-PUCCH is notified as the configuration related to enhanced SR-PUCCH, the mobile station apparatus 1 applies the notified information on a time of prohibiting enhanced SR-PUCCH transmission to the SR-PUCCH transmission. In addition, when a value that indicates the maximum continuous transmission number of enhanced SR-PUCCH is notified as the configuration related to enhanced SR-PUCCH, the mobile station apparatus 1 applies the notified value that indicates the maximum continuous transmission number of enhanced SR-PUCCH to the SR-PUCCH transmission.

In addition, when a delay time from the enhanced SR-PUCCH transmission to the uplink radio resource allocation by the downlink control channel is notified as the configuration related to enhanced SR-PUCCH, the mobile station apparatus 1 applies the notified delay timer to the SR-PUCCH transmission and does not receive the downlink control channel while the delay timer is running.

In addition, the base station apparatus 2 may simultaneously configure a parameter related to SR-PUCCH and an extended parameter related to SR-PUCCH in the mobile station apparatus 1 using the initial RRC radio connection reconfiguration message (Step S101 in FIG. 3).

The base station apparatus 2 may determine whether the SR-PUCCH transmission of the mobile station apparatus 1 is possible to extend on the basis of mobile station apparatus performance information that is configured in a mobile station apparatus performance message (UE capability) which is transmitted from the mobile station apparatus 1 (not illustrated in the drawing). Alternatively, the base station apparatus 2 may determine whether the configuration related to enhanced SR-PUCCH is possible on the basis of an RRC radio connection request message or an RRC radio configuration completion message, include the parameter related to enhanced SR-PUCCH in the initial RRC radio connection reconfiguration message (Step S101 in FIG. 3), and transmit the initial RRC radio connection reconfiguration message. The mobile station apparatus 1 may configure information that indicates that the configuration related to enhanced SR-PUCCH is possible in the transmission reason (cause) when notifying whether the configuration related to enhanced SR-PUCCH is possible using the RRC radio connection request message.

The mobile station apparatus 1 may indicate whether the extension of the SR-PUCCH transmission is possible to the base station apparatus 2 by including one-bit information that indicates whether the extension of the SR-PUCCH transmission is possible (whether the mobile station apparatus 1 supports the function of enhanced SR-PUCCH transmission) in the mobile station apparatus performance information and transmitting the mobile station apparatus performance information. Alternatively, the mobile station apparatus 1 may indicate whether the extension of the SR-PUCCH transmission is possible to the base station apparatus 2 by including information that indicates that the extension of the SR-PUCCH transmission is possible in the mobile station apparatus performance information and transmitting the mobile station apparatus performance information only when the extension of the SR-PUCCH transmission is possible. That is, when the extension of the SR-PUCCH transmission is not possible, the mobile station apparatus performance information is transmitted without including the information that indicates that the extension of the SR-PUCCH transmission is possible.

RRC messages that already exist in EUTRA may be reused besides preparing newly defined messages as each control message in FIG. 3. For example, an RRC connection reconfiguration message, an RRC connection reconfiguration complete message, and a measurement report message may be respectively reused by adding required parameters thereto as the RRC radio connection reconfiguration message, the RRC radio connection reconfiguration complete message, and the radio resource request control message.

In the description hereinbefore, the mobile station apparatus 1 transmits the radio resource request control message to the base station apparatus 2 when the extension of the configuration related to SR-PUCCH is determined to be allowable. However, the mobile station apparatus 1 may be configured to periodically transmit the radio resource request control message to the base station apparatus 2 when the periodic timer configured from the base station apparatus 2 is expired. The periodic timer may be individually configured from the base station apparatus 2, may be uniquely decided in the system, or may be obtained from the broadcast information. In addition, the periodic timer may be configured for each predetermined parameter or for each predetermined parameter group. That is, the base station apparatus 2 may configure the multiple periodic timers with respect to the mobile station apparatus 1.

In addition, the mobile station apparatus 1 may use the radio resource request control message to indicate a state that is preferable for performing the radio resource request to the base station apparatus 2. That is, the mobile station apparatus 1 may notify the base station apparatus 2, by using the radio resource request control message, of information that indicates which state is appropriate as the radio resource requesting method among the results determined on the basis of the state of the mobile station apparatus 1 (1) a state where SR-PUCCH is not configured, (2) a state where SR-PUCCH is configured, and (3) a state where enhanced SR-PUCCH is configured.

In addition, the mobile station apparatus 1 may use the radio resource request control message to indicate the preferable radio resource requesting method for performing the radio resource request to the base station apparatus 2. That is, the mobile station apparatus 1 may notify the base station apparatus 2, by using the radio resource request control message, of information that indicates which radio resource requesting method is appropriate among the results determined on the basis of the state of the mobile station apparatus 1 (1) a radio resource requesting method by the physical random access channel, (2) a radio resource requesting method by SR-PUCCH, and (3) a radio resource requesting method by enhanced SR-PUCCH.

A parameter (a first parameter) related to the SR-PUCCH transmission is configured in the mobile station apparatus 1 of the present embodiment from the base station apparatus 2. In addition, the mobile station apparatus 1 of the present embodiment can determine that the configuration related to enhanced SR-PUCCH is applicable on the basis of a parameter (a second parameter) that determines a state of the mobile station apparatus 1 related to the SR-PUCCH transmission (that is, a transmission state of the SR-PUCCH) from the base station apparatus 2. In addition, the mobile station apparatus 1 can determine that the configuration related to enhanced SR-PUCCH is applicable on the basis of the parameter that determines a state of the mobile station apparatus 1 related to SR-PUCCH configured from the base station apparatus 2. In addition, the mobile station apparatus 1 can notify the base station apparatus 2 of information that indicates that the configuration related to enhanced SR-PUCCH is applicable.

The base station apparatus 2 of the present embodiment configures the parameter (the first parameter) related to the SR-PUCCH transmission in the mobile station apparatus 1. In addition, the base station apparatus 2 of the present embodiment can configure the parameter (the second parameter) for determining a state of the mobile station apparatus 1 related to SR-PUCCH (a transmission state of the SR-PUCCH) in the mobile station apparatus 1 and can cause the mobile station apparatus 1 to start monitoring the state of the mobile station apparatus 1. Then, the base station apparatus 2 can cause the mobile station apparatus 1 to determine the state of the mobile station apparatus 1 related to SR-PUCCH. In addition, the base station apparatus 2 can transmit the configuration related to enhanced SR-PUCCH to the mobile station apparatus 1 by receiving the information that indicates that the configuration related to enhanced SR-PUCCH is applicable from the mobile station apparatus 1.

Accordingly, the mobile station apparatus 1 can notify the base station apparatus 2 that a predetermined state is fulfilled in which the physical uplink control channel that is used in the radio resource request can be efficiently used. The base station apparatus 2 can notify the mobile station apparatus 1 of the configuration for the physical uplink control channel extension on the basis of the predetermined state. Therefore, the radio resource request between the mobile station apparatus 1 and the base station apparatus 2 becomes efficient, and the efficiency of the radio resource use is improved.

Second Embodiment

A second embodiment of the present invention will be described below. The example in which the mobile station apparatus 1 notify the base station apparatus 2 by transmitting the information that indicates that the predetermined state is satisfied during communication is disclosed in the first embodiment. In the present embodiment, an example in which the mobile station apparatus 1 notifies by determining necessity of radio resources of the physical uplink control channel used in the radio resource request during communication will be disclosed. Configurations of the mobile station apparatus 1 and the base station apparatus 2 used in the present embodiment may be respectively the same as those in FIG. 1 and FIG. 2. Thus, descriptions thereof will be omitted.

Generally, it results in a higher efficiency of radio resource utilization by not releasing SR-PUCCH for the radio resource request if the radio resource request is performed periodically and continuously for a short time. Meanwhile, it results in a higher efficiency of radio resource utilization by releasing SR-PUCCH for the radio resource request if the radio resource request is periodic, and the period is comparatively long. For this reason, a method in which a new timer for determining the transmission period of the radio resource request is configured in the mobile station apparatus 1 to determine whether to release the configuration related to SR-PUCCH is simple and effective. Specific content for realizing this method will be described with reference to FIG. 4.

Figure 4:
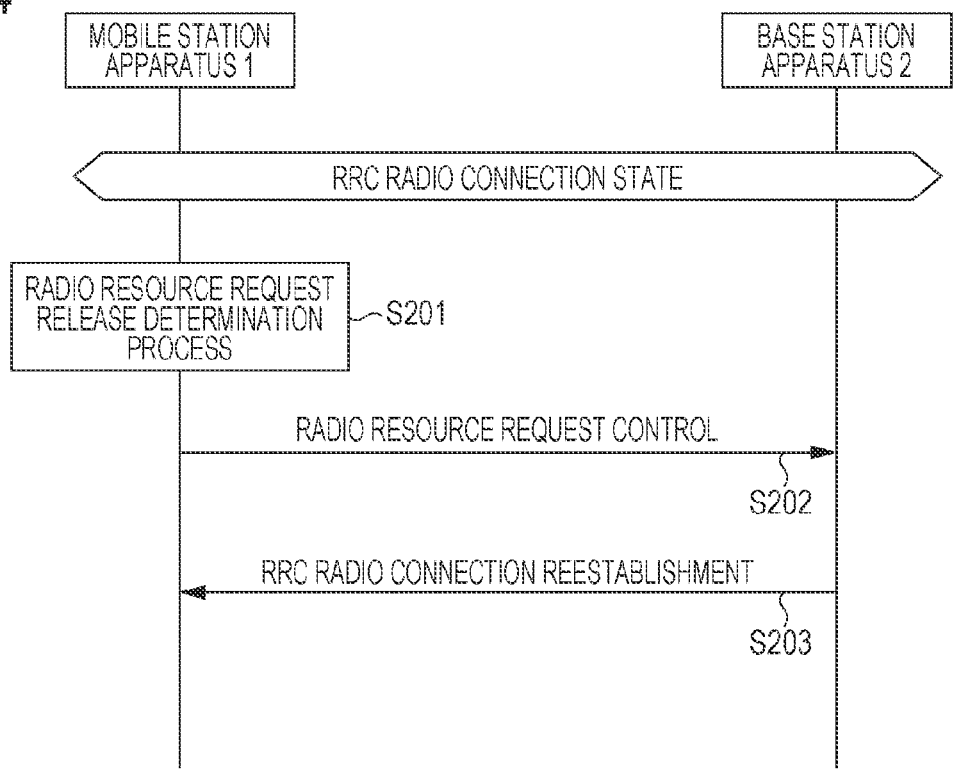
FIG. 4 is a sequence chart diagram illustrating an example of operation of a mobile station apparatus and a base station apparatus according to a second embodiment of the present invention.

FIG. 4 is a sequence chart diagram illustrating exchange of information related to the radio resource request control between the mobile station apparatus 1 and the base station apparatus 2 in the present embodiment. The mobile station apparatus 1 and the base station apparatus 2 starting from the RRC radio connection state are the same as in the procedure in FIG. 3. In addition, the parameter related to SR-PUCCH is assumed to be individually (that is, for each mobile station apparatus 1) configured in the mobile station apparatus 1 in FIG. 4.

The mobile station apparatus 1 performs a radio resource request release determination process in Step S201. The radio resource request release determination process is a process performed by the mobile station apparatus 1 to determine whether to release the configuration related to SR-PUCCH or the configuration related to enhanced SR-PUCCH that is configured.

As the radio resource request release determination process (Step S201), the mobile station apparatus 1 activates a radio resource request release timer to start measuring time when SR-PUCCH or enhanced SR-PUCCH is configured. The mobile station apparatus 1 determines that necessity of holding the configuration related to SR-PUCCH or the configuration related to enhanced SR-PUCCH is being low when the radio resource request release timer is expired. That is, when the radio resource request release timer is expired, the mobile station apparatus 1 determines that a condition that triggers the release of SR-PUCCH and/or enhanced SR-PUCCH is fulfilled, and determines it results in higher efficiency of radio resource utilization by releasing SR-PUCCH and/or enhanced SR-PUCCH.

The radio resource request release timer is configured using the broadcast information of the cell or is individually configured for each mobile station apparatus 1 from the base station apparatus 2. The radio resource request release timer may be configured as part of the configuration related to SR-PUCCH or as part of the configuration related to enhanced SR-PUCCH. In addition, the radio resource request release timer may be a common timer value or may be an individual timer value to SR-PUCCH and enhanced SR-PUCCH.

The radio resource request release timer may be initialized, started, or restarted when the radio resource request is transmitted. In addition, the radio resource request release timer may be initialized, started, or restarted when the trigger of the radio resource request is established. In addition, the radio resource request release timer may be initialized, started, or restarted when uplink transmission buffer information report (buffer status report) is transmitted. In addition, the radio resource request release timer may be initialized, started, or restarted when the uplink transmission buffer becomes empty.

Furthermore, an offset timer may be applied to the conditions that trigger the start or the restart of the radio resource request release timer described above. For example, the radio resource request release timer may be started or restarted when a time corresponding to the offset timer elapses after the radio resource request is transmitted. Apparently, any other conditions that trigger the radio resource request release timer may be applied in the mobile station apparatus 1 besides the conditions described above. In addition, the mobile station apparatus 1 may perform the radio resource request release determination process under other triggering conditions besides the radio resource request release timer described above.

The mobile station apparatus 1 may determine whether to perform the radio resource request release determination process on the basis of cell-specific information obtained from the broadcast information of the base station apparatus 2 or individual configuration information configuration for each mobile station apparatus 1. The base station apparatus 2 may determine whether to cause the mobile station apparatus 1 to perform the radio resource request release determination process by configuration the cell-specific information notified using the broadcast information of the base station apparatus 2 or the individual configuration information for each mobile station apparatus 1. In addition, the mobile station apparatus 1 may perform the radio resource request release determination process only when the configuration related to enhanced SR-PUCCH is notified.

Information related to the validity/invalidity of the configured radio resource request release determination process may be notified the mobile station apparatus 1 from the base station apparatus 2. The base station apparatus 2 may notify the mobile station apparatus 1 of the information related to the validity/invalidity of the configured radio resource request release determination process.

Based on any methods described above, the mobile station apparatus 1 that determines that the condition that triggers the release of the configuration related to SR-PUCCH and/or enhanced SR-PUCCH is fulfilled includes information that indicates the release of the configuration related to SR-PUCCH and/or enhanced SR-PUCCH in a radio resource request release notification message and transmits the radio resource request release notification message to the base station apparatus 2 (Step S202). The mobile station apparatus 1 may include the established triggering condition in the radio resource request release notification message and transmit the radio resource request release notification message to the base station apparatus 2. In addition, the mobile station apparatus 1 may include the index number of the established triggering condition in the radio resource request release notification message and transmit the radio resource request release notification message to the base station apparatus 2.

The mobile station apparatus 1 may include the value of the buffer status report in the radio resource request release notification message and transmit the radio resource request release notification message to the base station apparatus 2. In addition, the mobile station apparatus 1 may include information that indicates the reason of the release of the configuration related to SR-PUCCH and/or enhanced SR-PUCCH in the radio resource request release notification message and transmit the radio resource request release notification message to the base station apparatus 2.

The radio resource request release notification message is desirably transmitted using the layer 3 message or the layer 2 message, but may be transmitted using the layer 1 message. The radio resource request release notification message may be the indication message that does not require a response from the base station apparatus 2, or may be the request message that requires a response from the base station apparatus 2.

The base station apparatus 2 that receives the radio resource request release notification message then releases the configuration related to SR-PUCCH and/or enhanced SR-PUCCH with respect to the mobile station apparatus 1 when necessary (Step S203). The base station apparatus 2 notifies the mobile station apparatus 1 of the release of the configuration related to SR-PUCCH and/or enhanced SR-PUCCH by using the RRC radio connection reconfiguration message.

The mobile station apparatus 1 that determines that the triggering condition is fulfilled may autonomously release the configuration related to SR-PUCCH and/or enhanced SR-PUCCH and then notify the base station apparatus 2 of information that indicates that the release is done by using the radio resource request control message.

The parameter (the first parameter) related to the SR-PUCCH and/or enhanced SR-PUCCH transmission is configured from the base station apparatus 2 to the mobile station apparatus 1 of the present embodiment. In addition, the mobile station apparatus 1 of the present embodiment can determine whether the configuration related to SR-PUCCH and/or enhanced SR-PUCCH can be released on the basis of the parameter (the second parameter) that determines whether the configuration related to SR-PUCCH and/or enhanced SR-PUCCH can be released from the base station apparatus 2. In addition, the mobile station apparatus 1 can notify the base station apparatus 2 of information that indicates whether the configuration related to SR-PUCCH and/or enhanced SR-PUCCH can be released.

The base station apparatus 2 of the present embodiment configures the parameter (the first parameter) related to the SR-PUCCH and/or enhanced SR-PUCCH transmission in the mobile station apparatus 1. In addition, the base station apparatus 2 of the present embodiment can configures the parameter (the second parameter) that determines whether the configuration related to SR-PUCCH and/or enhanced SR-PUCCH is possible in the mobile station apparatus 1 and cause the mobile station apparatus 1 to start monitoring the state of the mobile station apparatus 1. Then, the base station apparatus 2 can cause the mobile station apparatus 1 to determine the state of the mobile station apparatus 1 related to SR-PUCCH and/or enhanced SR-PUCCH. In addition, the base station apparatus 2 can notifies the mobile station apparatus 1 of the release of the configuration related to SR-PUCCH and/or enhanced SR-PUCCH by receiving information that indicates that the configuration related to SR-PUCCH and/or enhanced SR-PUCCH can be released from the mobile station apparatus 1.

Accordingly, the mobile station apparatus 1 can notify the base station apparatus 2 that a predetermined state is satisfied in which the physical uplink control channel that is used in the radio resource request can be efficiently used. The base station apparatus 2 can notify the mobile station apparatus 1 of the configuration for the physical uplink control channel extension on the basis of the predetermined state. Therefore, the radio resource request between the mobile station apparatus 1 and the base station apparatus 2 becomes efficient, and the efficiency of radio resource use is improved.

The embodiments described above are only simple examples. Various modification examples and substitution examples can be made to realize the invention. For example, the present uplink transmission scheme can be applied to any communication system that uses frequency division duplexing (FDD) scheme or time division duplexing (TDD) scheme. In addition, path loss or other measurement values (SIR, SINR, RSRP, RSRQ, RSSI, and BLER) may be alternatively used as the downlink measurement value. Combinations of these multiple measurement values may also be used. In addition, the name of each parameter illustrated in the embodiments is for convenience of description. Even if the name of the parameters that is actually applied is different from the name of parameters in the present application, this does not affect the intent of the invention claimed in the present application.

The mobile station apparatus 1 is not limited to a mobile terminal. Stationary terminals with the function of the mobile station apparatus 1 mounted thereon or with other manners may be used to realize the embodiments of the present invention. The mobile station apparatus is also referred to as a user terminal, a terminal apparatus, a communication terminal, a mobile machine, a mobile station (MS), and a user equipment (UE). The base station apparatus is also referred to as a radio base station apparatus, a base station (BS), a radio base station, a fixed station, a Node-B (NB), an evolved Node-B (eNB), and a base transceiver station (BTS).

The mobile station apparatus 1 and the base station apparatus 2 of the embodiments are described using functional block diagrams for convenience of description. However, steps in methods and algorithms for realizing the functions of each unit or part of these functions in the mobile station apparatus 1 and the base station apparatus 2 can be directly specified by hardware, software modules executed by processors, or a combination of the hardware and the software modules. If mounted by software, the function may be maintained or transferred as one or more commands or codes on a computer-readable medium. The computer-readable medium includes both communication media and computer recording media that include a medium which helps computer programs be transported from one place to another place.

The mobile station apparatus 1 and the base station apparatus 2 may be controlled by recording the one or more commands or codes on the computer-readable recording medium and reading and executing the one or more commands or codes recorded on the recording medium into a computer system. The "computer system" here is assumed to include an OS and hardware such as peripheral devices.

The operations described in each embodiment of the present invention may be realized by a program. A program that operates in the mobile station apparatus 1 and the base station apparatus 2 and is related to each embodiment of the present invention is a program that controls a CPU and the like (a program that causes a computer to function) so as to realize the functions of the above embodiments related to each embodiment of the present invention. The information handled in these apparatuses is temporarily accumulated in a RAM when processed, is subsequently stored in various ROMs and HDDs, is read by the CPU when necessary, and is modified or written. In addition, the functions of the above embodiments are realized not only by executing the program. The functions of each embodiment of the present invention may also be realized through a joint process with the program and the operating system or other application programs on the basis of the instructions of the program.

The "computer-readable recording medium" is a portable medium such as a semiconductor medium (for example, the RAM, a non-volatile memory card, and the like), an optical recording medium (for example, a DVD, an MO, an MD, a CD, a BD, and the like), and a magnetic recording medium (for example, a magnetic tape, a flexible disk, and the like) or is a storage device such as a disk unit incorporated in the computer system. Furthermore, the "computer-readable recording medium" is assumed to include a medium that dynamically maintains the program for a short time such as a communication line in case of transmitting the program via a network like the Internet or via a communication circuit like a telephone circuit and include a medium that maintains the program for a constant time such as a volatile memory inside the computer system that serves as a server or a client.

The above program may be a program that realizes part of the functions described above. Further, the above program may be a program that can realize the functions described above by combining with other programs that are already recorded in the computer system.

Each function block or features of the mobile station apparatus 1 and the base station apparatus 2 used in the each embodiment above may be mounted or executed by versatile application processors, digital signal processors (DSP), application-specific integrated circuits (ASIC), field-programmable gate array signals (FPGA) or other programmable logic devices, discrete gates or transistor logics, discrete hardware components, or a combination of these devices designed to execute the functions described in the present specification. The versatile application processor may be a microprocessor, but instead, the processor may be a processor of the related art, a controller, a microcontroller, or a state machine.

The processor may also be mounted as a combination of computing devices. The combination of computing devices is, for example, the DSP and the microprocessor, the multiple microprocessors, one or more microprocessors connected to a DSP core, or any other such configurations.

While embodiments of the invention are described hereinbefore in detail on the basis of the particular specific examples, the intent of each embodiment and claims of the present invention are apparently not limited to these particular specific examples. That is, descriptions in the present specification are intended for illustration purpose and does not impose any limits on each embodiment of the present invention.

DESCRIPTION OF REFERENCE NUMERALS 1 mobile station apparatus
2 base station apparatus
101, 201 reception unit
102, 202 demodulation unit
103, 203 decoding unit
104 measurement process unit
105, 204 control unit
106 uplink buffer control unit
107, 205 encoding unit
108, 206 modulation unit
109, 207 transmission unit
110 uplink radio resource request control unit
111 random access control unit
112, 208 upper layer
209 network signal transmission and reception unit

The invention claimed is:

1. A terminal apparatus in a communication system that includes a base station apparatus and the terminal apparatus, the terminal apparatus comprising:
   receiving circuitry configured to receive a transmission configuration of an uplink control channel, wherein the transmission configuration is selected between a first transmission configuration and a second transmission configuration based on information; and
   transmission circuitry configured to transmit the information and to transmit the uplink control channel based on the transmission configuration, wherein the information indicates whether the second transmission configuration is supported or not and the second transmission configuration includes an extended parameter of the first transmission configuration and the parameter is related to a resource for a scheduling request, and the uplink control channel is used for the scheduling request.

2. A radio resource requesting method of a terminal apparatus in a communication system including a base station apparatus and a terminal apparatus, the method comprising at least:
   receiving a transmission configuration of an uplink control channel, wherein the transmission configuration is selected between a first transmission configuration and a second transmission configuration based on information, and
   transmitting the information, and
   transmitting the uplink control channel based on the transmission configuration, wherein the information indicates whether the second transmission configuration is supported or not and the second transmission configuration includes an extended parameter of the first transmission configuration and the parameter is related to a resource for a scheduling request, and the uplink control channel is used for the scheduling request.

* * * * *